United States Patent
Unnikrishnan (10) Patent No.: US 11,442,558 B2
(45) Date of Patent: Sep. 13, 2022

(54) INPUT DEVICES, METHODS FOR PROVIDING AN INPUT TO A COMPUTING SYSTEM AND COMPUTER READABLE MEDIA

(71) Applicant: RAZER (ASIA-PACIFIC) PTE. LTD., Singapore (SG)

(72) Inventor: Sreenath Unnikrishnan, Singapore (SG)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 0 days.

(21) Appl. No.: 16/334,697

(22) PCT Filed: Sep. 23, 2016

(86) PCT No.: PCT/SG2016/050468
§ 371 (c)(1),
(2) Date: Mar. 19, 2019

(87) PCT Pub. No.: WO2018/056896
PCT Pub. Date: Mar. 29, 2018

(65) Prior Publication Data
US 2020/0081559 A1    Mar. 12, 2020

(51) Int. Cl.
*G06F 3/0354*    (2013.01)
*G06F 3/03*    (2006.01)
(Continued)

(52) U.S. Cl.
CPC ........ *G06F 3/03543* (2013.01); *G06F 3/0304* (2013.01); *G06F 3/038* (2013.01); *G06F 3/0346* (2013.01)

(58) Field of Classification Search
CPC .. G06F 3/03543; G06F 3/0304; G06F 3/0346; G06F 3/038
See application file for complete search history.

(56) References Cited

U.S. PATENT DOCUMENTS 5,825,350 A * 10/1998 Case, Jr. ............... G06F 3/0346
345/163
6,433,780 B1    8/2002 Gordon et al.
(Continued)

FOREIGN PATENT DOCUMENTS

| EP | 1677178 A1 | 7/2006 |
| TW | 201409400 A | 3/2014 |
| TW | I500904 B | 9/2015 |

OTHER PUBLICATIONS

Extended European Search Report dated Jun. 19, 2019, 10 pages, for the corresponding European Patent Application No. 16916915.8.
(Continued)

*Primary Examiner* — Lixi C Simpson
(74) *Attorney, Agent, or Firm* — Polsinelli PC (57) ABSTRACT

According to various embodiments, there is provided an input device including a height sensor structure configured to provide a height output indicative of whether a gap between the input device and a reference surface is larger than a threshold value; a control circuit configured to control tracking of a movement of the input device in a plane defined by the reference surface, based on the height output; a motion detector configured to provide a detector output indicative of a direction of an at least substantially vertical motion of the input device; and an adjustment circuit configured to adjust the threshold value based on the detector output.

19 Claims, 4 Drawing Sheets

(51) Int. Cl.
  *G06F 3/0346* (2013.01)
  *G06F 3/038* (2013.01)

(56) References Cited

U.S. PATENT DOCUMENTS

| | | |
|---|---|---|
| 7,688,307 B1 | 3/2010 | Tsyrganovich |
| 7,696,980 B1 | 4/2010 | Piot et al. |
| 7,821,499 B2 | 10/2010 | Gates et al. |
| 7,898,524 B2 | 3/2011 | Theytaz et al. |
| 7,973,768 B2 | 7/2011 | Ang et al. |
| 8,081,159 B2 | 12/2011 | Wenstrand et al. |
| 8,380,459 B2 | 2/2013 | Moussavi |
| 8,570,194 B2 | 10/2013 | DePue et al. |
| 9,092,071 B2 | 7/2015 | Dejnabadi et al. |
| 2005/0057492 A1 | 3/2005 | Bathiche et al. |
| 2006/0125794 A1 | 6/2006 | Afriat |
| 2007/0291001 A1 | 12/2007 | Trisnadi et al. |
| 2009/0135140 A1 | 5/2009 | Constantin et al. |
| 2010/0060488 A1* | 3/2010 | DePue ............... G06F 3/0317 341/20 |
| 2010/0088652 A1* | 4/2010 | Ramsay, III ........ G06F 3/0481 715/857 |
| 2010/0103108 A1 | 4/2010 | Hotelling et al. |
| 2013/0194235 A1* | 8/2013 | Zanone ............... G06F 3/0416 345/175 |
| 2014/0132499 A1 | 5/2014 | Schwesinger et al. |
| 2016/0195916 A1* | 7/2016 | Shiozaki ............ H04N 5/23241 348/333.13 |

OTHER PUBLICATIONS

International Search Report and Written Opinion, dated Jun. 5, 2017, for the corresponding International Application No. PCT/SG2016/050468 in 11 pages.

CASTOR | Mionix, Ergonomic Gaming Mouse for All Grip Styles, Jul. 13, 2016, https://mionix.net/product/castor/ in 10 pages.

Office Action (including English Translation) dated Sep. 15, 2021, for the corresponding Taiwanese Application No. 106132586 in 15 total pages.

* cited by examiner

INPUT DEVICES, METHODS FOR PROVIDING AN INPUT TO A COMPUTING SYSTEM AND COMPUTER READABLE MEDIA

TECHNICAL FIELD

Various embodiments relate to input devices and methods for providing inputs to a computing system.

BACKGROUND

An input device, such as a computer mouse, may be used to provide user inputs to a computing system. For example, the input device may be used to control a position of a cursor displayed on a display screen of a computing system. An input device may translate its movement over a reference surface, such as a mouse pad, into movement of the cursor. Input devices generally have a lift-off distance. Lift-off distance refers to a vertical distance from the reference surface, at which the input device stops tracking its own motion over the reference surface. The lift-off distance may be an inherent characteristic of the tracking sensor used in the input device. The tracking sensor may be unable to track the movements of the input device due to inability to receive reflection of signals from the reference surface, when the input device is lifted above the lift-off distance. A gamer using a low dots per inch (DPI) computer mouse may need to frequently re-position the computer mouse on the reference surface by lifting the computer mouse to cut off the tracking process of the computer mouse, then move the computer mouse to a desired location, before placing the computer mouse back onto the mouse mat. The gamer may re-position the computer mouse for various reasons, for example to move the computer mouse back to a comfortable position or to avoid going over the edge of a mouse mat. Ideally, the tracking of the computer mouse should be cut off during re-positioning, so that the computer mouse may be re-positioned without significantly changing the position of the corresponding onscreen cursor. In reality, re-positioning of the computer mouse usually causes unintended and unpredictable cursor movements as the computer mouse continues to be tracked as long as it is within the lift-off distance. Therefore, gamers typically prefer their computer mice to have a low lift-off distance, especially in the context of first-person shooter (FPS) games which may require frequent re-positioning of the computer mice. With a low lift-off distance, the computer mouse need not be lifted too high to be re-positioned, thereby saving time and effort for the user. However, a gamer may unintentionally lift the computer mouse off the reference surface by very small distances when making swift manipulations of the cursor in the game. Under such a scenario, a low lift-off distance may be disadvantageous to the gamer as the mouse tracking may be cut off.

Therefore, there is a need for an input device that is able to minimize unintentional cursor movement when the input device is being re-positioned, while also avoiding the potential hazards of having the lift-off distance set too low.

SUMMARY

According to various embodiments, there may be provided an input device including a height sensor structure configured to provide a height output indicative of whether a gap between the input device and a reference surface is larger than a threshold value; a control circuit configured to control tracking of a movement of the input device in a plane defined by the reference surface, based on the height output; a motion detector configured to provide a detector output indicative of a direction of an at least substantially vertical motion of the input device; and an adjustment circuit configured to adjust the threshold value based on the detector output.

According to various embodiments, there may be provided a method for providing an input to a computing system, the method including: providing a height output indicative of whether a gap between an input device and a reference surface is larger than a threshold value; controlling tracking of a movement of the input device in a plane defined by the reference surface, based on the height output; providing a detector output indicative of a direction of an at least substantially vertical motion of the input device; and adjusting the threshold value based on the detector output.

According to various embodiments, there may be provided a non-transitory computer readable medium storing a program executable to cause a processor to execute a process including: provide a height output indicative of whether a gap between an input device and a reference surface is larger than a threshold value; control tracking of a movement of the input device in a plane defined by the reference surface, based on the height output; provide a detector output indicative of a direction of an at least substantially vertical motion of the input device; and adjust the threshold value based on the detector output.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

Embodiments described below in context of the devices are analogously valid for the respective methods, and vice versa. Furthermore, it will be understood that the embodiments described below may be combined, for example, a part of one embodiment may be combined with a part of another embodiment.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

In this context, the input device as described in this description may include a memory which is for example used in the processing carried out in the input device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

An input device, such as a computer mouse, may be used to provide user inputs to a computing system. For example, the input device may be used to control a position of a cursor displayed on a display screen of a computing system. An input device may translate its movement over a reference surface, such as a mouse pad or another substantially (e.g. plane) surface such as for example, the surface of a table, and the like, into movement of the cursor. Input devices generally have a lift-off distance. Lift-off distance refers to a vertical distance from the reference surface, at which the input device stops tracking its own motion over the reference surface. The lift-off distance may be an inherent characteristic of the tracking sensor used in the input device. The tracking sensor may be unable to track the movements of the input device due to inability to receive reflection of signals from the reference surface, when the input device is lifted above the lift-off distance. A gamer using a low dots per inch (DPI) computer mouse may need to frequently re-position the computer mouse on the reference surface by lifting the computer mouse to cut off the tracking process of the computer mouse, then move the computer mouse to a desired location, before placing the computer mouse back onto the mouse mat. The gamer may re-position the computer mouse for various reasons, for example to move the computer mouse back to a comfortable position or to avoid going over the edge of a mouse mat. Ideally, the tracking of the computer mouse should be cut off during re-positioning, so that the computer mouse may be re-positioned without significantly changing the position of the corresponding onscreen cursor. In reality, re-positioning of the computer mouse usually causes unintended and unpredictable cursor movements as the computer mouse continues to be tracked as long as it is within the lift-off distance. Therefore, gamers typically prefer their computer mice to have a low lift-off distance, especially in the context of first-person shooter (FPS) games which may require frequent re-positioning of the computer mice. With a low lift-off distance, the computer mouse need not be lifted too high to be re-positioned, thereby saving time and effort for the user. However, a gamer may unintentionally lift the computer mouse off the reference surface by very small distances when making swift manipulations of the cursor in the game. Under such a scenario, a low lift-off distance may be disadvantageous to the gamer as the mouse tracking may be cut off.

In the context of various embodiments, "mouse mat" may be but is not limited to being interchangeably referred to as a "mouse pad".

In the context of various embodiments, "computer mouse" may be but is not limited to being interchangeably referred to as a "mouse".

According to various embodiments, an input device such as a computer mouse may have a variable tracking distance. The tracking distance may be varied automatically, depending on whether the input device is being moved upwards or downwards. The tracking distance refers to the maximum distance at which the input device can be lifted off from a reference surface and still function to control a position of a cursor on a computing system. In other words, the tracking distance refers to the maximum gap between the input device and the reference surface at which the movement of the input device is still being tracked. The reference surface refers to an at least substantially planar surface on which the input device is moved, for the purpose of providing inputs to a computing system. The reference surface may be a mouse pad or a table top. The tracking distance, as well as the variability of the tracking distance, may be user-configurable. The tracking distance may be shorter than the inherent lift-off distance of the input device. The inherent lift-off distance may be dictated by the tracking mechanism of the input device. The tracking distance may be set to a higher value when the input device is being lifted up and the tracking distance may be set to a lower value when the mouse is being put down. As a result, the tracking of the input device may not be wrongly cut-off when a user of the input device inadvertently lifts the input device off during rapid mouse movements, yet the tracking of the input device does not resume prematurely when the input device is being re-positioned.

Figure 1:
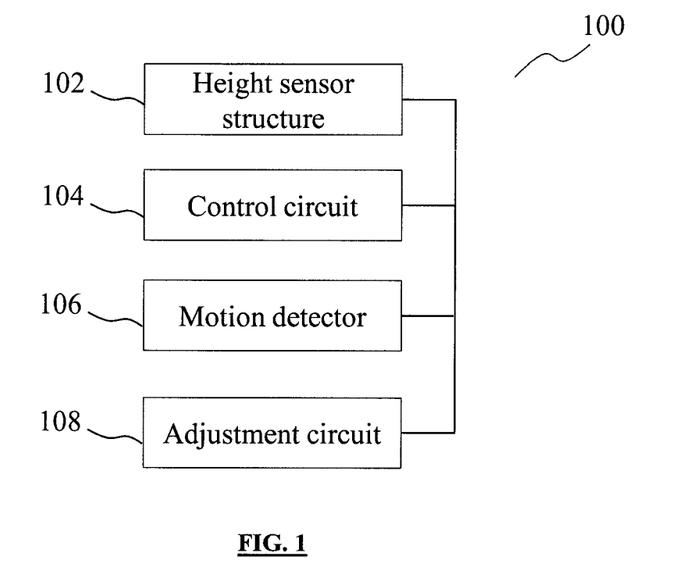
FIG. 1 shows a conceptual diagram of an input device according to various embodiments.

FIG. 1 shows a conceptual diagram of an input device 100 according to various embodiments. The input device 100 may include a height sensor structure 102 configured to provide a height output indicative of whether a gap between the input device 100 and a reference surface is larger than a threshold value. The input device 100 may further include a control circuit 104 configured to control tracking of a movement of the input device 100 in a plane defined by the reference surface, based on the height output. The input device 100 may further include a motion detector 106 configured to provide a detector output indicative of a direction of an at least substantially vertical motion of the input device 100. The input device 100 may further include an adjustment circuit 108 configured to adjust the threshold value based on the detector output.

In other words, according to various embodiments, an input device 100 may include a height sensor structure 102, a control circuit 104, a motion detector 106 and an adjustment circuit 108. The height sensor structure 102 may be configured to provide a height output indicative of whether a gap between the input device 100 and a reference surface is larger than a threshold value. The height output may be a binary output. The height output may be generated only when the gap between the input device and the reference surface is larger than the threshold value. The control circuit 104 may be configured to control tracking of a movement of the input device 100 in a plane defined by the reference surface, based on the height output. The control circuit 104 may receive the height output from the height sensor structure 102. The motion detector 106 may be configured to provide a detector output. The detector output may be indicative of a direction of an at least substantially vertical motion of the input device 100. The detector output may include the dataset of "up" and "down" and the detector output may be one from the dataset. The adjustment circuit 108 may be configured to adjust the threshold value based on the detector output. At a next time frame, the height sensor structure 102 may be configured to provide a next height output based on whether the gap between the input device 100 and the reference surface is larger than the adjusted threshold value.

Figure 2:
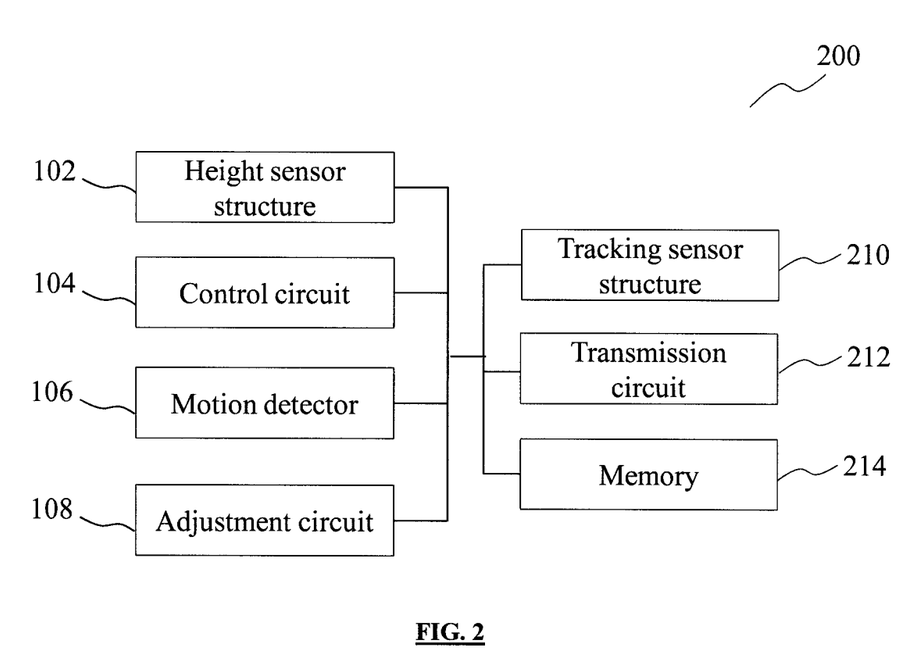
FIG. 2 shows a conceptual diagram of an input device according to various embodiments.

FIG. 2 shows a conceptual diagram of an input device 200 according to various embodiments. The input device 200 may be similar to the input device 100 in that it may include a height sensor structure 102, a control circuit 104, a motion detector 106 and an adjustment circuit 108. In addition, the input device 200 may include a tracking sensor structure 210, a transmission circuit 212 and a memory 214. The tracking sensor structure 210 may be configured to track a movement of the input device 200 in the plane defined by the reference surface. The transmission circuit 212 may be configured to transmit data to a computing system. The data may include a movement of the input device 200 in the plane defined by the reference surface. The memory 214 may be configured to store the threshold value.

Figure 3:
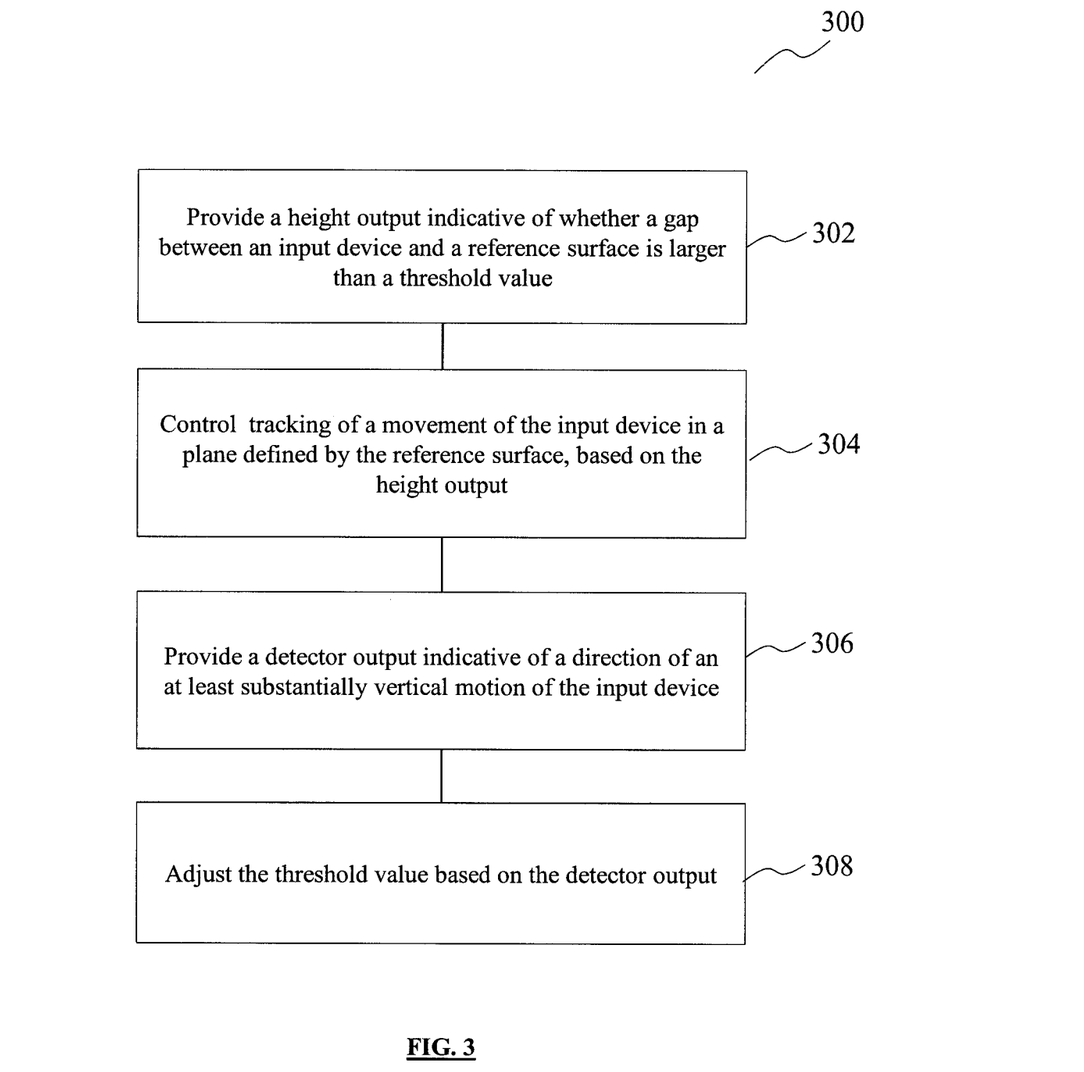
FIG. 3 shows a flow diagram of a method for providing an input to a computing system, according to various embodiments.

FIG. 3 shows a flow diagram 300 of a method for providing an input to a computing system, according to various embodiments. In 302, a height output indicative of whether a gap between an input device and a reference surface is larger than a threshold value, may be provided. The height output may be provided using a height sensor structure. In 304, tracking of a movement of the input device in a plane defined by the reference surface may be controlled based on the height output. The tracking of the movement may be controlled using a control circuit. In 306, a detector output indicative of a direction of an at least substantially vertical motion of the input device, may be provided. The detector output may be provided using a motion detector. In 308, the threshold value may be adjusted based on the detector output. The threshold value may be adjusted using an adjustment circuit.

According to various embodiments, an input device may include an accelerometer. The accelerometer may be the motion detector 106. The accelerometer may detect vertical movements of the input device, for example when the input device is moved up and then put back down, when a user is re-positioning the input device. When the input device is being moved up, as reported by the accelerometer, the threshold value may be set to a first value. When the input device is being moved down, as reported by the accelerometer, the threshold value may be set to a second value. A user may pre-define or customize the first value and the second value, for example through a user interface on the input device, or through a user interface on a computing system. The computing system may be coupled to the input device. The threshold value may be implemented via a firmware built into the input device, or through software on the computing system. The threshold value may not be set higher than what is achievable by the tracking sensor, but may be set lower than the lift-off distance of the tracking sensor. The second value may be set lower than the first value, so that the input device may not prematurely start tracking again before it is arranged back onto the reference surface. The threshold values may be stored either in the computing system, or in a memory in the input device.

Figure 4:
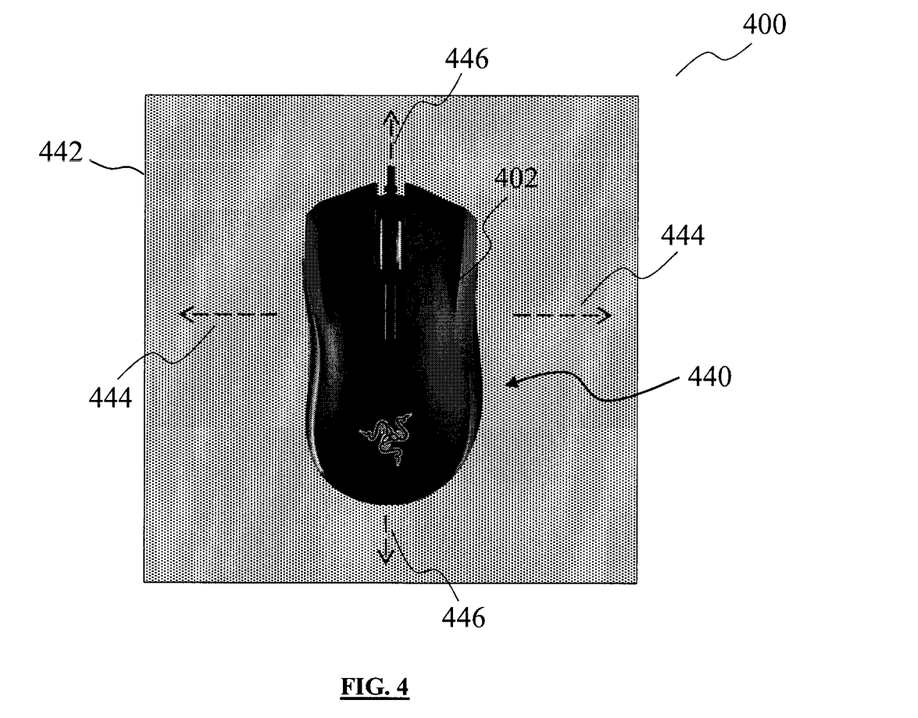
FIG. 4 shows a top view of a computer mouse, according to various embodiments.

FIG. 4 shows a top view 400 of a computer mouse 440, according to various embodiments. The computer mouse 440 may be the input device 100 or the input device 200. The computer mouse 440 may be coupled to a computing system, so as to control a visual cursor on the graphical user interface of the computing system. The computer mouse 440 may include a housing 402. The housing 402 may also be referred herein as a casing or a body of the computer mouse 440. The housing 402 may be the component of the computer mouse 440 that is held in a user's hand and to be moved about to provide a positional input to a computing system. The housing 402 may enclose internal components of the computer mouse 440, including at least one of the height sensor structure 102, the control circuit 104, the motion detector 106, the adjustment circuit 108, the tracking sensor structure 210, the transmission circuit 212 and the memory 214. The computer mouse 440 may be placed on a reference surface 442. The reference surface 442 may be a top surface of a mouse pad, or a table top, or any work surface. To operate the computer mouse 440, for example, to move the cursor, the computer mouse 440 may be displaced relative to the reference surface 442, while being at least substantially in contact with the reference surface 442. In other words, the computer mouse 440 may be moved in a two-dimensional plane including an x-axis 444 and a y-axis 446. The two-dimensional plane may be defined by the reference surface 442, or may be at least substantially parallel to the reference surface 442. The movements of the computer mouse 440 relative to the reference surface 442 may be tracked by the tracking sensor structure 210. The tracking sensor structure 210 may provide the tracking data to the computing system through the transmission circuit 212. The tracking sensor structure 210 may be one of an optical navigation system or a laser tracker.

Figure 5:
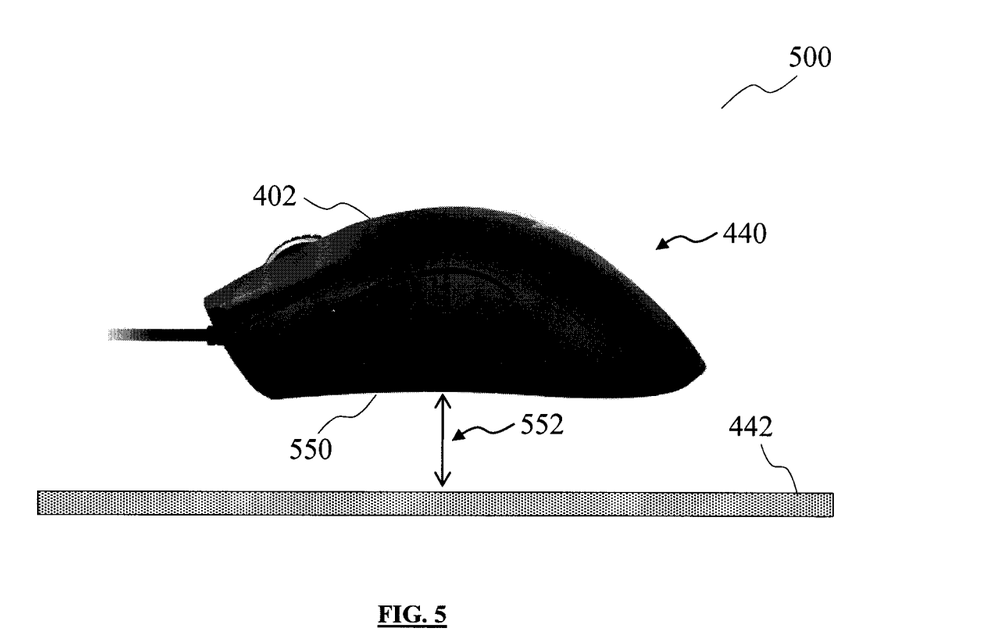
FIG. 5 shows a side view of a computer mouse according to various embodiments.

FIG. 5 shows a side view 500 of the computer mouse 440. The housing 402 may have a base 550, in other words, a bottom surface. The base 550 may come into contact with the reference surface 442, when the computer mouse 440 is being shifted relative to the reference surface 442 to provide a navigational input for an onscreen cursor. The computer mouse 440 may have a lift-off distance by virtue of limitations of the tracking sensor structure 210. The horizontal displacement of the computer mouse 440 may cease to be tracked, when the computer mouse 440 is lifted above the lift-off distance, i.e. when the vertical displacement 552 is larger than the lift-off distance. The vertical displacement 552 may refer to the distance between the base 550 and the reference surface 442. For example, the tracking sensor structure 210 may function by transmitting optical signals to the reference surface 442 and receiving reflections of the optical signals from the reference surface 442. When the computer mouse 440 is lifted above the lift-off distance, the tracking sensor structure 210 may not be able to receive sufficient reflections of the optical signals for the purpose of tracking. Therefore, the tracking function of the computer mouse 440 may be disabled when the computer mouse 440 is lifted above the lift-off distance. The tracking sensor structure 210 may track the computer mouse 440 when the computer mouse 440 is positioned lower than the lift-off distance, unless otherwise configured using a threshold value.

A computing system user may re-position the computer mouse 440 from time to time during the running of a computer application, for example, to bring the computer mouse 440 back to a centre of the reference surface 442. Unintended and unpredictable cursor movements may occur, during the process of re-positioning the computer mouse 440. The process of re-positioning may inevitably involve horizontal displacement of the computer mouse 440 relative to the reference surface 442 when the vertical displacement 552 is less than the threshold value, since a human hand is unlikely to be able to move exactly vertically upwards without involving minor hand vibrations. Such minor deviations from a vertical upward movement may translate into substantial cursor movements, i.e. positional inputs received by the graphical user interface in the computing system. The lift-off distance of the computer mouse 440 may influence the degree to which an onscreen cursor may move during the lifting up of the input device before the vertical displacement 552 exceeds the lift-off distance, as well as the degree to which the onscreen cursor may move when the computer mouse 440 is being put back on the reference surface 442, after the vertical displacement 552 becomes less than the lift-off distance.

This unpredictable movement of the computer mouse 440 is undesirable, as it may cause the cursor to move away from its last position, the last position being the position where the cursor was at, when the computer mouse 440 was being lifted up. Therefore, a low lift-off distance may be generally preferred by gamers. Nonetheless, a very low lift-off distance may also be undesirable, if the user often makes fast movements in the computer application, as fast manipulations of the computer mouse 440 may cause the base 550 to be lifted slightly above the reference surface 442. A computer mouse 440 with a very low lift-off distance may not translate movements of the computer mouse 440 into movements of the cursor during these fast manipulations. Therefore, it may be difficult to determine an ideal lift-off distance for the computer mouse 440, which may depend on a gamer's playing style, as well as the game that is being played. Moreover, it may not be easy to change the lift-off distance of the computer mouse 440. One way to change the lift-off distance may be to change the reference surface 442. For example using the computer mouse 440 on a matte mouse pad may yield a different lift-off distance as compared to using the computer mouse 440 on a glossy mouse pad. However, the adjustability of the lift-off distance may generally still be limited by the type of tracking sensor structure used in the computer mouse 440. For example, laser tracking sensors typically have a large lift-off distance.

Even after changing the mouse pad, a user using a laser mouse may find that the lift-off distance is still too high.

To overcome the problem that the lift-off distance may not be easily adjustable to a user's preferred distance, the computer mouse 440 may refer to a user-defined threshold value in deciding whether to continue tracking. The threshold value may also be referred herein as tracking distance. The threshold value may be defined as the maximum distance from the reference surface 442 at which the computer mouse 440 is configured to allow tracking. In other words, the computer mouse 440 may disable tracking when the vertical displacement 552 is larger than the threshold value. The tracking of the position of the computer mouse 440 may resume, when the vertical displacement 552 becomes less than the threshold value. The threshold value may be applicable both in the context of "lift-off", i.e. lifting the computer mouse 440 away from the reference surface 442, as well as the context of "touchdown", i.e. putting the computer mouse 440 back onto the reference surface 442. The threshold value may be used as an "artificial" substitute of the inherent lift-off distance. As the threshold value is a virtual characteristic instead of a physical characteristic of the tracking sensor structure, the threshold value may be easily adjusted by the gamer to optimize the performance of the computer mouse 440 according to his gaming style and gaming requirements. The computer mouse 440 may also function with more than one threshold value, for example the threshold value may be set to a first value when the computer mouse 440 is being moved upward, and the threshold value may be set to a second value when the computer mouse 440 is being moved downward. In other words, there may be a first threshold value that applies when the input device is being lifted up, and there may be a second threshold value that applies when the input device is being placed onto a reference surface. The computer mouse 440 may also have individually customizable threshold values for different accelerations, for example the threshold value when the computer mouse 440 is moving very fast, for example during unintentional vertical movements due to swift manipulations of the cursor, may be different from the threshold value when the computer mouse 440 is moving relatively slower, for example during a routine re-positioning process.

The computer mouse 440 may include a height sensor structure 102 for judging whether the vertical displacement 552 is larger than the threshold value. The height sensor structure 102 may include an accelerometer. The height sensor structure 102 may also include an image sensor that computes the vertical displacement 552 through image processing, for example by comparing images captured of the reference surface at various distances. The height sensor structure 102 may include the tracking sensor structure 210. The computer mouse 440 may also include a control circuit 104 for controlling tracking of movements of the computer mouse 440 in a plane defined by the reference surface 442, based on whether the vertical displacement 552 is determined to be larger than the threshold value. For example, the control circuit 104 may stop the tracking when the vertical displacement 552 exceeds the threshold value. Controlling tracking of movements may refer to at least one of controlling the tracking sensor structure 210, controlling a transmission of the tracking data, or controlling processing of the raw data collected by the tracking sensor structure 210. The control circuit 104 may stop the tracking by switching off the tracking sensor structure 210. The control circuit 104 may be configured to deactivate the tracking sensor structure 210 when the gap between the computer mouse 440 and the reference surface 442 is larger than the threshold value. Alternatively, the control circuit 104 may be configured to stop the tracking by suspending transmission of the tracking data to the computing system, by controlling the transmission circuit 212. The control circuit 104 may be configured to deactivate the transmission circuit 212 when the gap between the computer mouse 440 and the reference surface 442 is larger than the threshold value. The control circuit 104 may also stop the tracking, by inhibiting the raw data collected by the tracking sensor structure 210 from being processed or translated into data revealing movements of the computer mouse 440. The computer mouse 440 may also include a motion detector 106 for detecting a vertical motion of the computer mouse 440. When the computer mouse 440 is lifted up from the reference surface 442, the motion detector 106 may detect that the computer mouse 440 is moving vertically and may determine a direction of the vertical movement. The motion detector 106 may provide a detector output to an adjustment circuit, the detector output being indicative of the determined direction. The motion detector 106 may include an accelerometer. The motion detector 106 may also include the height sensor structure 102, and may compute the direction of the vertical motion based on a rate of change of the vertical displacement 552. The motion detector 106 may include an image capture device that captures images of the reference surface, and then determine the direction of the vertical motion based on analyzing changes in the captured images. The motion detector 106 may also be a computation circuit that determines the direction of the vertical motion based on output from the tracking sensor structure 210. The adjustment circuit 108 may adjust the threshold value based on the detector output, for example to adjust the threshold value to a smaller value when the computer mouse 440 is being moved downwards.

Figure 6:
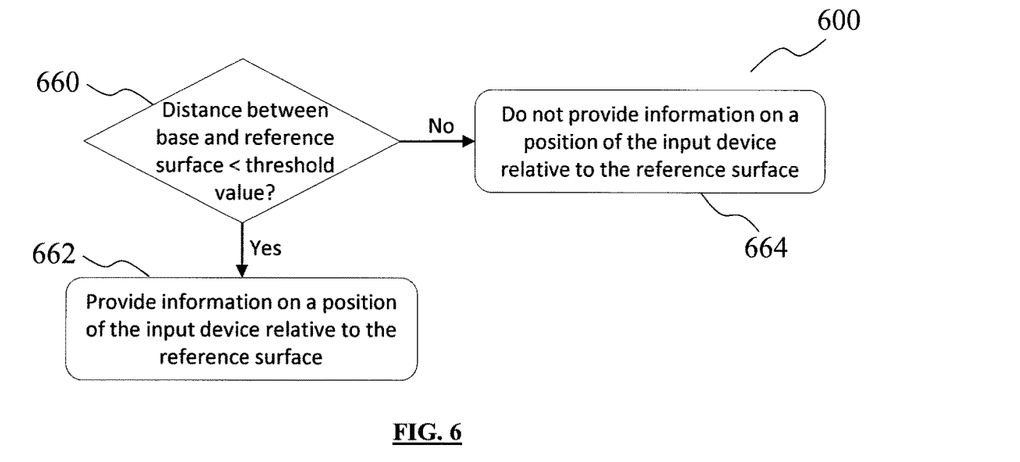
FIG. 6 shows a flowchart relating to part of a process for providing inputs to a computing system.

FIG. 6 shows a flowchart 600 relating to part of a process for providing inputs to a computing system. The part of the process may be the tracking process of an input device according to various embodiments. In step 660, it may be determined whether a distance between the base 552 of the input device and the reference surface may be within the threshold value. In other words, it may be determined whether the vertical displacement 552 is less than the threshold value. If the outcome of the determination in step 660 is positive, the process may proceed to step 662, where information on a position of the input device relative to the reference surface may be provided to the computing system. If the outcome of the determination in step 664 is negative, the process may proceed to step 664, where information on the position of the input device relative to the reference surface is not provided to the computing system. For example, the communication interface may between the computing system and the input device may block the information on the position from being sent to the computing system. Alternatively, the tracking sensor structure in the input device may be suspended from tracking the position of the input device.

Figure 7:
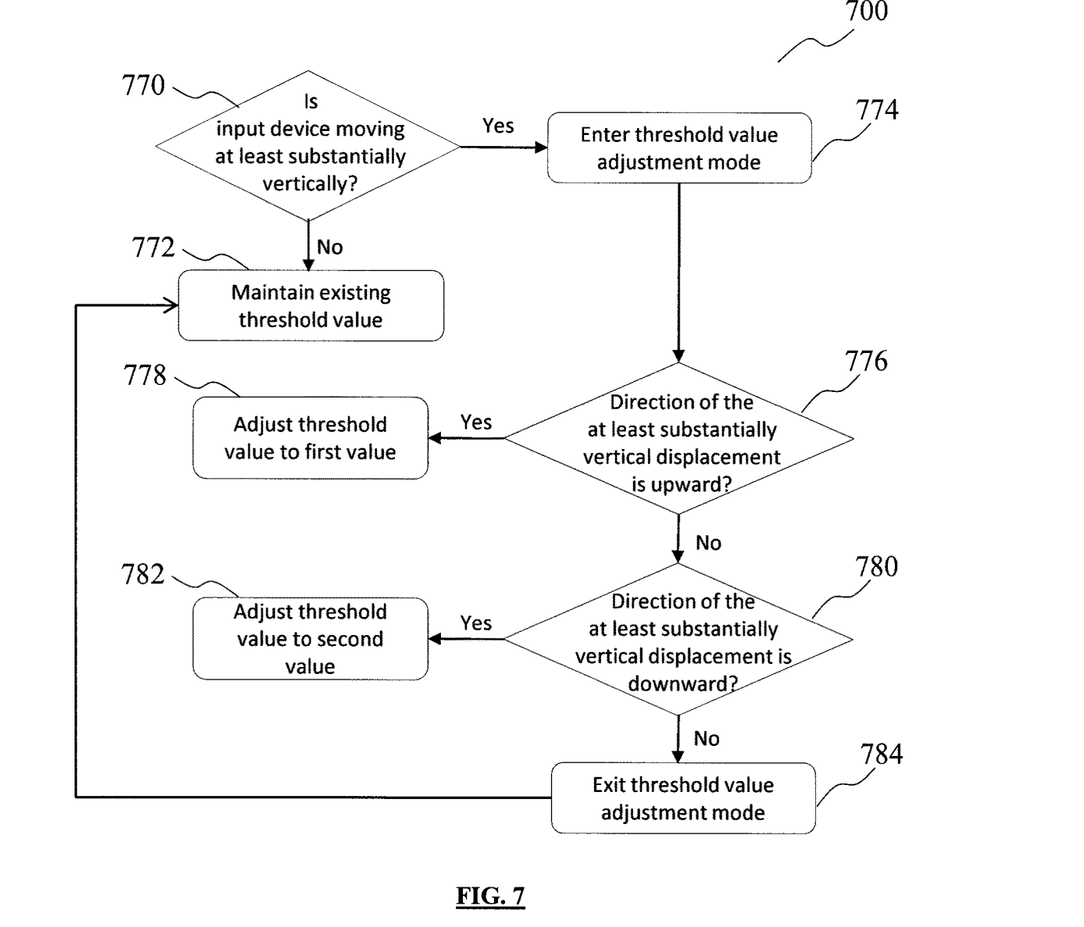
FIG. 7 shows a flowchart relating to another part of a process for providing inputs to a computing system.

FIG. 7 shows a flowchart 700 relating to another part of a process for providing inputs to a computing system. The other part of the process may be the definition of the threshold value. In step 770, it may be determined whether the input device is moving at least substantially vertically. If the outcome of the determination in step 770 is negative, the process may maintain the existing threshold value in step 772. If the outcome of the determination in step 770 is positive, the process may enter a threshold value adjustment mode in step 774. Following step 774, the process may proceed to step 776, where it may be determined whether the direction of the at least substantially vertical movement is upward. If the direction of the at least substantially vertical movement is upward, the process may proceed to step 778, where the threshold value may be adjusted to a first value. If the determined outcome of step 776 is negative, the process may proceed to step 780 instead of step 778, where it may be determined whether the direction of the at least substantially vertical movement is downward. If the determined outcome of step 780 is positive, the process may proceed to step 782, where the threshold value is adjusted to a second value. If the determined outcome of step 780 is negative, the process may proceed to step 784 to exit the threshold adjustment mode.

With gaming becoming more and more competitive, professional gamers need computer mice that are able to offer the highest possible accuracy and minimal unpredictability in terms of tracking. The computer mouse 440 may provide a means for gamers to solve a problem that has come to become a part of all mouse sensors, which is the unavoidable movement of the cursor when the mouse is re-positioned.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced. It will be appreciated that common numerals, used in the relevant drawings, refer to components that serve a similar or the same purpose.

The following examples pertain to further embodiments.

Example 1 is an input device including: a height sensor structure configured to provide a height output indicative of whether a gap between the input device and a reference surface is larger than a threshold value; a control circuit configured to control tracking of a movement of the input device in a plane defined by the reference surface, based on the height output; a motion detector configured to provide a detector output indicative of a direction of an at least substantially vertical motion of the input device; and an adjustment circuit configured to adjust the threshold value based on the detector output.

In example 2, the subject-matter of example 1 can optionally include that the height output is generated only when the gap between the input device and the reference surface is larger than the threshold value.

In example 3, the subject-matter of example 1 or example 2 can optionally include a tracking sensor structure configured to track the movement of the input device in the plane defined by the reference surface.

In example 4, the subject-matter of example 3 can optionally include that the height sensor structure includes the tracking sensor structure.

In example 5, the subject-matter of example 3 or example 4 can optionally include that the control circuit is configured to control tracking of the movement of the input device by controlling the tracking sensor structure.

In example 6, the subject-matter of example 5 can optionally include that the control circuit is configured to deactivate the tracking sensor structure when the gap between the input device and a reference surface is larger than the threshold value.

In example 7, the subject-matter of any one of examples 1 to 6 can optionally include a transmission circuit configured to transmit data to a computing system, the data including the movement of the input device in the plane defined by the reference surface.

In example 8, the subject-matter of example 7 can optionally include that the control circuit is configured to control the transmission circuit to deactivate transmission of the data when the gap between the input device and a reference surface is larger than the threshold value.

In example 9, the subject-matter of example 7 can optionally include that the control circuit is configured to deactivate the transmission circuit when the gap between the input device and a reference surface is larger than the threshold value.

In example 10, the subject-matter of any one of examples 1 to 9 can optionally include that the motion detector includes an accelerometer.

In example 11, the subject-matter of any one of examples 1 to 10 can optionally include that the motion detector includes the height sensor structure.

In example 12, the subject-matter of any one of examples 1 to 11 can optionally include that the adjustment circuit is configured to adjust the threshold value to a first value when the direction of the at least substantially vertical motion is upward, and wherein the adjustment circuit is further configured to adjust the threshold value to a second value when the direction of the at least substantially vertical motion is downward.

In example 13, the subject-matter of example 12 can optionally include that the second value is lower than the first value.

In example 14, the subject-matter of example 12 or example 13 can optionally include that each of the first value and the second value is user-customizable through a user interface.

In example 15, the subject-matter of example 14 can optionally include that the user interface is provided on at least one of the input device or a computing system coupled to the input device.

In example 16, the subject-matter of any one of examples 1 to 15 can optionally include a memory configured to store the threshold value.

In example 17, the subject-matter of any one of examples 1 to 16 can optionally include that the input device is coupled to a computing system, the threshold value being stored in the computing system.

In example 18, the subject-matter of any one of examples 1 to 17 can optionally include that at a next time frame, the height sensor structure is configured to provide a next height output, based on whether the gap between the input device and the reference surface is larger than the adjusted threshold value.

Example 19 is a method for providing an input to a computing system, the method including: providing a height output indicative of whether a gap between an input device and a reference surface is larger than a threshold value; controlling tracking of a movement of the input device in a plane defined by the reference surface, based on the height output; providing a detector output indicative of a direction of an at least substantially vertical motion of the input device; and adjusting the threshold value based on the detector output.

In example 20, the subject-matter of example 19 can optionally include that controlling tracking of the movement of the input device in the plane defined by the reference surface based on the height output includes inhibiting tracking of the movement of the input device in the plane defined by the reference surface when the gap between the input device and the reference surface is larger than the threshold value.

In example 21, the subject-matter of example 19 or example 20 can optionally include transmitting data to the computing system, the data including the movement of the input device in the plane defined by the reference surface.

In example 22, the subject-matter of example 21 can optionally include that controlling tracking of the movement of the input device in the plane defined by the reference surface based on the height output includes inhibiting transmission of the data when the gap between the input device and the reference surface is larger than the threshold value.

In example 23, the subject-matter of any one of examples 19 to 22 can optionally include that adjusting the threshold value based on the detector output includes adjusting the threshold value to a first value when the direction of the at least substantially vertical motion is upward, and adjusting the threshold value to a second value when the direction of the at least substantially vertical motion is downward.

Example 24 is a non-transitory computer readable medium storing a program executable to cause a processor to execute a process including: provide a height output indicative of whether a gap between an input device and a reference surface is larger than a threshold value; control tracking of a movement of the input device in a plane defined by the reference surface, based on the height output; provide a detector output indicative of a direction of an at least substantially vertical motion of the input device; and adjust the threshold value based on the detector output.

The invention claimed is:

1. A computer mouse comprising:
    a height sensor structure configured to provide a height output indicative of whether a gap between the computer mouse and a reference surface is larger than a threshold value, wherein the threshold value is initially at an existing threshold value;
    a control circuit configured to control tracking of a movement of the computer mouse in a plane defined by the reference surface, based on the height output;
    a motion detector configured to provide a rate of change of a vertical displacement and a detector output indicative of a direction of an at least substantially vertical motion of the computer mouse; and
    an adjustment circuit configured to maintain the existing threshold value and to adjust the threshold value for unintentional movement and different accelerations of the computer mouse based on the motion detector output, wherein the threshold value is adjusted higher to a first threshold value when the direction of the at least substantially vertical motion by the computer mouse is upward to disable tracking and lower to a second threshold value when the direction of the at least substantially vertical motion by the computer mouse is downward to resume tracking and wherein the first and second threshold values are customizable for different accelerations.

2. The computer mouse of claim 1, wherein the height output is generated only when the gap between the computer mouse and the reference surface is larger than the existing threshold value.

3. The computer mouse of claim 1, further comprising at least one of a memory configured to store the threshold values and a tracking sensor structure configured to track the movement of the computer mouse in the plane defined by the reference surface.

4. The computer mouse of claim 3, wherein the height sensor structure comprises the tracking sensor structure or an accelerometer.

5. The computer mouse of claim 3, wherein the control circuit is configured to control tracking of the movement of the computer mouse by controlling the tracking sensor structure.

6. The computer mouse of claim 5, wherein the control circuit is configured to deactivate the tracking sensor structure when the gap between the computer mouse and a reference surface is larger than the existing threshold value.

7. The computer mouse of claim 1, further comprising a transmission circuit configured to transmit data to a computing system, the data comprising the movement of the computer mouse in the plane defined by the reference surface.

8. The computer mouse of claim 7, wherein the control circuit is configured to at least one of control the transmission circuit to deactivate transmission of the data when the gap between the computer mouse and a reference surface is larger than the existing threshold value, and deactivate the transmission circuit when the gap between the computer mouse and a reference surface is larger than the existing threshold value.

9. The computer mouse of claim 1, wherein the motion detector comprises an accelerometer.

10. The computer mouse of claim 1, wherein the second value is lower than the first value.

11. The computer mouse of claim 1, wherein each of the first value and the second value is user-customizable through a user interface.

12. The computer mouse of claim 11, wherein the user interface is provided on at least one of the computer mouse or a computing system coupled to the computer mouse.

13. The computer mouse of claim 1, wherein the computer mouse is coupled to a computing system, the threshold values being stored in the computing system.

14. The computer mouse of claim 1, wherein at a next time frame, the height sensor structure is configured to provide a next height output, based on whether the gap between the computer mouse and the reference surface is larger than the adjusted existing threshold value.

15. A method for providing an input to a computing system, the method comprising:
    providing a height sensor output indicative of whether a gap between a computer mouse and a reference surface is larger than a threshold value, wherein the threshold value is initially at an existing threshold value;
    controlling tracking of a movement of the computer mouse in a plane defined by the reference surface, based on the height output;
    providing a motion detector output indicative of a rate of change of a vertical displacement and a direction of an at least substantially vertical motion of the computer mouse; and
    maintaining the existing threshold value or adjusting the threshold value for unintentional movement and different accelerations of the computer mouse based on the motion detector output, wherein the threshold value is adjusted higher to a first threshold value when the direction of the at least substantially vertical motion by the computer mouse is upward to disable tracking and lower to a second threshold value when the direction of the at least substantially vertical motion by the computer mouse is downward to resume tracking and wherein the first and second threshold values are customizable for different accelerations.

16. The method of claim 15, wherein controlling tracking of the movement of the computer mouse in the plane defined by the reference surface based on the height output comprises inhibiting tracking of the movement of the computer mouse in the plane defined by the reference surface when the gap between the computer mouse and the reference surface is larger than the existing threshold value.

17. The method of claim 15, further comprising transmitting data to the computing system, the data comprising the movement of the computer mouse in the plane defined by the reference surface.

18. The method of claim 17, wherein controlling tracking of the movement of the computer mouse in the plane defined by the reference surface based on the height output comprises inhibiting transmission of the data when the gap between the computer mouse and the reference surface is larger than the existing threshold value.

19. A non-transitory computer readable medium storing a program executable to cause a processor to execute a process comprising:
    provide a height sensor output indicative of whether a gap between a computer mouse and a reference surface is larger than a threshold value, wherein the threshold value is initially at an existing threshold value;
    control tracking of a movement of the computer mouse in a plane defined by the reference surface, based on the height output;
    provide a motion adjistput indicative of a rate of change of a vertical displacement and a direction of an at least substantially vertical motion of the computer mouse; and
    maintain the existing threshold value or adjust the threshold value for unintentional movement and different accelerations of the computer mouse based on the motion detector output, wherein the threshold value is adjusted higher to a first threshold value when the direction of the at least substantially vertical motion by the computer mouse is upward to disable tracking and lower to a second threshold value when the direction of the at least substantially vertical motion by the computer mouse is downward to resume tracking and wherein the first and second threshold values are customizable for different accelerations.

* * * * *